(12) United States Patent
Gladden

(10) Patent No.: US 6,550,247 B1
(45) Date of Patent: Apr. 22, 2003

(54) MULTIPLE PARALLEL TURBOCHARGER CONTROL WITH DISCRETE STEP NOZZLES

(75) Inventor: John R. Gladden, Lafayette, IN (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 09/943,175

(22) Filed: Aug. 30, 2001

(51) Int. Cl.⁷ .................................................. F02B 33/44
(52) U.S. Cl. .......................................... 60/612; 60/600
(58) Field of Search ........................ 60/612, 602, 600; 123/562

(56) References Cited

U.S. PATENT DOCUMENTS

| | | | |
|---|---|---|---|
| 4,428,199 A | * 1/1984 | Moore et al. | .................. 60/600 |
| 5,408,979 A | 4/1995 | Backlund et al. | ............ 123/562 |
| 5,611,202 A | * 3/1997 | Sumser et al. | ................. 60/612 |
| 5,845,495 A | * 12/1998 | Schray et al. | .................. 60/612 |
| 6,158,219 A | * 12/2000 | Mailander | ..................... 60/612 |
| 6,202,414 B1 | * 3/2001 | Schmidt et al. | ................ 60/612 |
| 6,263,673 B1 | * 7/2001 | Schmidt et al. | ................ 60/612 |
| 6,314,737 B1 | * 11/2001 | Springer et al. | .............. 60/612 |

FOREIGN PATENT DOCUMENTS

DE        196 23 558 C1     4/1997

* cited by examiner

*Primary Examiner*—Thomas Denion
*Assistant Examiner*—Thai-Ba Trieu
(74) *Attorney, Agent, or Firm*—Todd T Taylor

(57) ABSTRACT

A control for a turbocharger system in an internal combustion engine particularly useful for multiple parallel turbochargers having turbines with discrete step variable nozzles. In response to a need for adjustment the variable nozzles are adjusted sequentially, not simultaneously. Sequential adjustment of the turbines minimizes the impact of the adjustment.

21 Claims, 1 Drawing Sheet

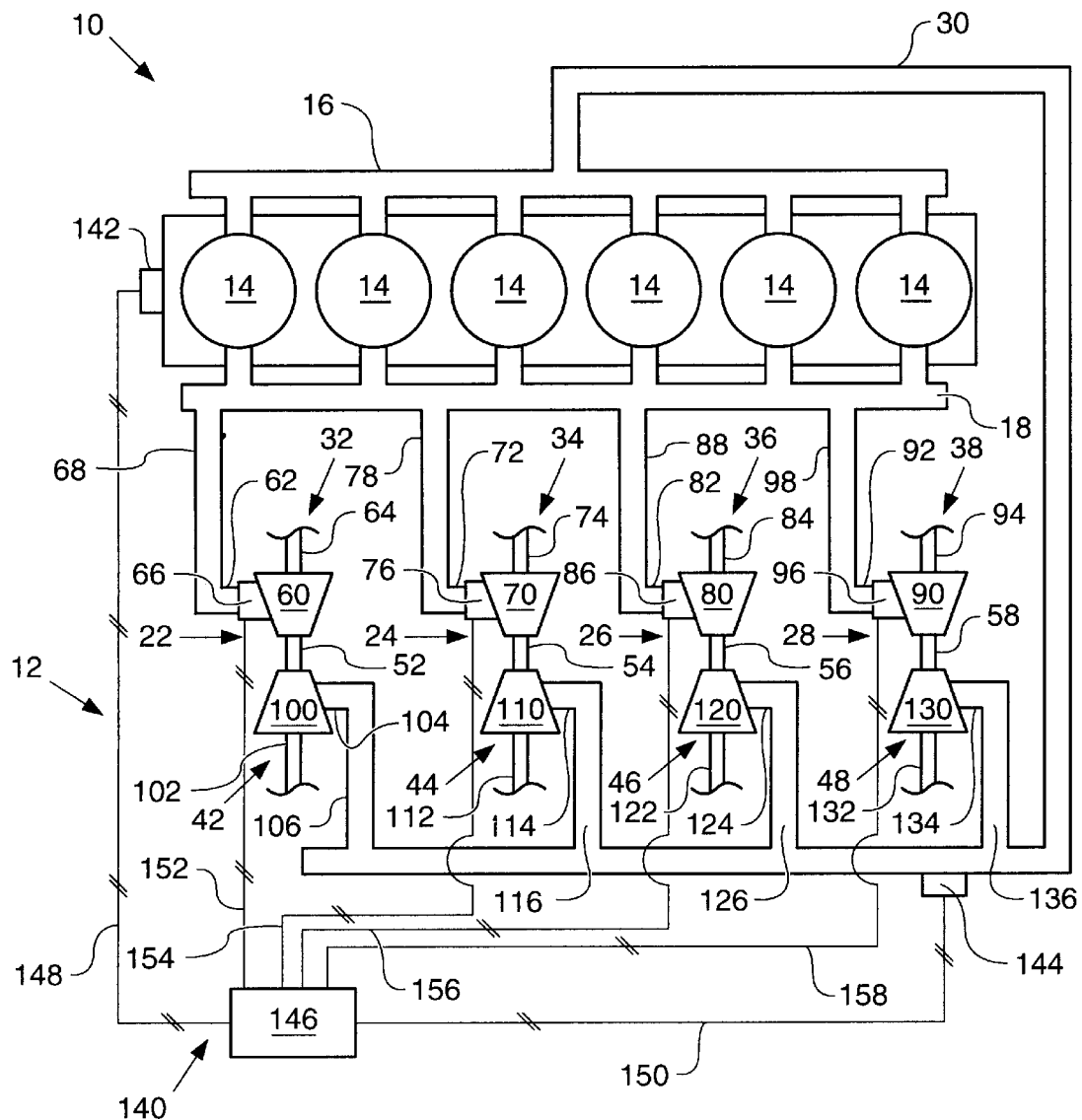

ual MULTIPLE PARALLEL TURBOCHARGER
CONTROL WITH DISCRETE STEP
NOZZLES

TECHNICAL FIELD

The present invention relates to internal combustion engine turbochargers, and, more particularly, to controlling the operation of a multiple parallel turbocharger system having variable geometry turbines with discrete adjustment steps.

BACKGROUND

A limiting factor in the performance of an internal combustion engine is the amount of combustion air that can be delivered to the intake manifold for combustion in the engine cylinders. Atmospheric pressure is often inadequate to supply the required amount of air for proper operation of an engine.

An internal combustion engine may include one or more turbochargers for compressing a fluid to be supplied to one or more combustion chambers within corresponding combustion cylinders. Each turbocharger typically includes a turbine driven by exhaust gases of the engine, and a compressor driven by the turbine. The compressor receives the fluid to be compressed and supplies the compressed fluid to the combustion chambers. The fluid compressed by the compressor may be in the form of combustion air only, or may be a mixture of fuel and combustion air. Through the use of a turbocharger, the power available from an engine of given size can be increased significantly. Thus, a smaller, less expensive engine may be used for a given power requirement, and power loss due to, for example, changes in altitude, can be compensated for.

To provide an adequate flow of combustion air, it is known to provide two or more turbochargers in a parallel relationship. Parallel turbines each receive a flow of exhaust gas from the engine exhaust manifold to provide motive force to the turbines of the turbochargers. Compressors of the turbochargers receive gaseous fluid to compress, and discharge compressed fluid for use in the combustion cylinders.

In an exhaust gas turbocharger, exhaust gas flow and turbine design determine turbine performance, and thereby compressor performance and turbocharger efficiency. Vanes in the inlet throat or nozzle of the turbine can be used to affect flow characteristics through the turbine, and thereby the turbine power generated for a given flow. If the engine is to be operated at or near full load during most of its operating cycle, it is not difficult to design the turbocharger for efficient performance. However, if the engine is to be operated at significantly less than full load for extended periods of time, it becomes more difficult to design a turbocharger that will perform well. Desirably, the turbocharger will provide the required level of pressure boost, respond quickly to load changes, and function efficiently, at both high load and low load conditions.

For an engine having a wide range of operating load, it has been know to size the turbine for proper performance under full load conditions. A problem with this approach is that the turbocharger responds slowly at low speed, and the boost pressure available at low engine speeds is minimal. As an alternative, it has been known to provide a turbine design that exceeds the power requirements at full load, and to use a waste gate to bypass excess exhaust gas flow after the turbocharger has reached the desired boost level. An "under-sized" turbine of this type will provide greater boost at lower load conditions, and will respond more quickly at lower speeds, but engine back pressure is increased and the energy in the bypassed exhaust flow is wasted.

Turbocharger performance can be controlled by the use of what are known as variable geometry turbines. In a variable geometry turbine, structures of the turbine affecting gas flow can be altered to impact the turbine performance and thereby the overall turbocharger performance. Frequently, the adjustment is at the inlet of the turbine, and may include vane adjustments or nozzle opening adjustments. Some types of variable geometry turbines operate only as discrete steps in nozzle area. Some utilize separate, distinct nozzles of differing area. Operation of multiple parallel turbochargers during a nozzle adjustment cycle is difficult. Surge, excessive exhaust temperatures and excessive turbocharger speeds are all detrimental conditions that can occur when operating multiple parallel turbochargers.

The present invention is directed to overcoming one or more of the problems as set forth above.

SUMMARY OF THE INVENTION

In one aspect of the invention, an internal combustion engine is provided with a plurality of combustion cylinders, an exhaust manifold coupled with the combustion cylinders, and an intake manifold coupled with the combustion cylinders. A plurality of turbochargers each includes a turbine having a variable geometry inlet connected to the exhaust manifold and having an outlet, and including a compressor having an inlet and an outlet, the compressor outlet coupled with the intake manifold. A sensor detects operating conditions and provides a signal dependent thereon. A controller is connected to the sensor to receive the signal, and is connected to the variable geometry inlets for sequential adjustment thereof in response to a need for adjustment.

In another aspect of the invention, a turbocharger system is provided for use with an internal combustion engine having a plurality of combustion cylinders, an intake manifold and first and second exhaust manifolds. The turbocharger system has a plurality of turbochargers each including a turbine having a variable geometry inlet connected to the exhaust manifold and having an outlet, and including a compressor having an inlet and an outlet, the compressor outlet coupled with the intake manifold. A sensor detects an operating condition and provides a signal dependent thereon. A controller is connected to the sensor to receive the signal, and is connected to the variable geometry inlets for sequential adjustment thereof in response to a need for adjustment.

In a further aspect of the invention, a method of operating an internal combustion engine is provided with steps of providing a plurality of combustion cylinders, an exhaust manifold and an intake manifold; transporting exhaust gas from the combustion cylinders to the exhaust manifold; providing a plurality of turbochargers, each turbocharger including a turbine having a variable geometry inlet and an outlet, and a compressor having an inlet and an outlet; providing adjustment means for adjusting positions of the variable geometry inlets; rotatably driving the turbines with exhaust gas introduced at the turbine inlets; introducing combustion gas at the compressor inlets; transporting combustion gas from the compressor outlets to the intake manifold; sensing operating conditions; controlling the adjustment means in response to at least one of the operating conditions; and adjusting at least some of the variable inlets sequentially.

In yet another aspect of the invention, a method for operating multiple parallel turbochargers for an internal combustion engine, is provided with steps of providing a variable geometry turbine for each turbocharger; sensing operating conditions, determining a need to adjust the variable geometry turbines; and adjusting the variable geometry turbines sequentially.

BRIEF DESCRIPTION OF THE DRAWINGS

FIG. 1 is a schematic illustration of an internal combustion engine having a multiple parallel turbocharger system for which the present control may be used advantageously.

DETAILED DESCRIPTION

Referring now to FIG. 1, an internal combustion engine 10 is shown having a turbocharger system 12 in which the present invention may be used.

Internal combustion engine 10 includes a plurality of combustion cylinders 14, and as shown in FIG. 1, includes six combustion cylinders 14. Each combustion cylinder 14 is coupled with an intake manifold 16 and with an exhaust manifold 18. While a single intake manifold 16 is shown, it should be understood that more than one intake manifold may be used, with each intake manifold 16 coupled to a plurality of combustion cylinders 14, for providing an air mixture to each combustion cylinder 14. Further, while a single exhaust manifold 18 is shown, it should be understood that more than one exhaust manifold could be provided, with each exhaust manifold coupled to a different plurality of combustion cylinders 14. A fuel, such as diesel fuel, is injected into each combustion cylinder and combusted therein, in a known manner.

Turbocharger system 12 includes a plurality of turbochargers 22, 24, 26 and 28, and in engine 10, as shown, includes first, second, third and fourth turbochargers 22, 24, 26, 28, respectively, arranged for parallel performance. Each turbocharger 22, 24, 26 and 28 is coupled to exhaust manifold 18 for receiving a flow of exhaust gas therefrom, and with intake manifold 16 via a duct 30, for supplying a flow of combustion gas to cylinders 14, as will be described in greater detail hereinafter.

First, second, third and fourth turbochargers 22, 24, 26, and 28 include, respectively, first, second, third and fourth turbines 32, 34, 36 and 38, and first, second, third and fourth compressors 42, 44, 46 and 48, respectively, operatively and drivingly coupled to turbines 32, 34, 36 and 38 by first, second, third and fourth shafts 52, 54, 56 and 58, respectively.

First turbine 32 includes a first turbine wheel 60 carried on first shaft 52. A first turbine inlet 62 and a first turbine outlet 64 are associated with first turbine wheel 60. First turbine 32 includes a controllably actuatable, first turbine variable intake nozzle 66 at inlet 62. Nozzle 66 is connected to exhaust manifold 18 via a fluid duct 68, and has a constriction area which may be controllably adjusted to thereby provide an inlet to first turbine 32 with a varying area. By varying the area of intake nozzle 66, the flow rate through first turbine 32 is controlled, which in turn controls the rotational output speed of first turbine 32 and first shaft 52. First turbine outlet 64 is connected to a further exhaust system (not shown) of engine 10, which may include one or more mufflers, with subsequent discharge to an ambient environment.

Second turbine 34 includes a second turbine wheel 70 carried on second shaft 54. A second turbine inlet 72 and a second turbine outlet 74 are associated with second turbine wheel 70. Second turbine 34 includes a controllably actuatable, second turbine variable intake nozzle 76 at inlet 72. Nozzle 76 is connected to exhaust manifold 18 via a fluid duct 78, and has a constriction area which may be controllably adjusted to thereby provide an inlet orifice to second turbine 34 with a varying area. By varying the area of intake nozzle 76, the power provided by the second turbine 34 is controlled, which in turn controls the rotational output speed of second turbine 34 and second shaft 54. Second turbine outlet 74 is connected to a further exhaust system (not shown) of engine 10, which may include one or more mufflers, with subsequent discharge to an ambient environment.

Third turbine 36 includes a third turbine wheel 80 carried on third shaft 56. A third turbine inlet 82 and a third turbine outlet 84 are associated with third turbine wheel 80. Third turbine 36 includes a controllably actuatable, third turbine variable intake nozzle 86 at inlet 82. Nozzle 86 is connected to exhaust manifold 18 via a fluid duct 88, and has a constriction area which may be controllably adjusted to thereby provide an inlet to third turbine 36 with a varying area. By varying the area of intake nozzle 86, the power output of the third turbine 36 is controlled, which in turn controls the rotational output speed of third turbine 36 and third shaft 56. Third turbine outlet 84 is connected to a further exhaust system (not shown) of engine 10, which may include one or more mufflers, with subsequent discharge to an ambient environment.

Fourth turbine 38 includes a fourth turbine wheel 90 carried on fourth shaft 58. A fourth turbine inlet 92 and a fourth turbine outlet 94 are associated with fourth turbine wheel 90. Fourth turbine 38 includes a controllably actuatable, fourth turbine variable intake nozzle 96 at inlet 92. Nozzle 96 is connected to exhaust manifold 18 via a fluid duct 98, and has a constriction area that may be controllably adjusted to thereby provide an inlet to fourth turbine 38 with a varying area. By varying the area of intake nozzle 96, the power output of the fourth turbine 38 is controlled, which in turn controls the rotational output speed of fourth turbine 38 and fourth shaft 58. Fourth turbine outlet 94 is connected to a further exhaust system (not shown) of engine 10, which may include one or more mufflers, with subsequent discharge to an ambient environment.

Each of first, second, third and fourth turbines 32, 34, 36 and 38 as thus far described is a variable geometry turbine. The respective nozzles 66, 76, 86 and 96 may have continuously variable positions within a range defined by the opposite extremes of the adjustment range, or may have discrete steps in opening size through which nozzles 66, 76, 86 and 96 may be adjusted. The present invention is particularly advantageous when used for turbines having discrete steps through which the nozzle may be adjusted.

First compressor 42 includes a first compressor wheel 100 carried on first shaft 52. A first compressor inlet 102 and a first compressor outlet 104 are associated with first compressor wheel 100. First compressor inlet 102 is connected to a source of combustion air (not shown), which may be ambient air. First compressor outlet 104 is connected to duct 30 by a fluid line 106.

Second compressor 44 includes a second compressor wheel 110 carried on second shaft 54. A second compressor inlet 112 and a second compressor outlet 114 are associated with second compressor wheel 110. Second compressor inlet 112 is connected to a source of combustion air (not shown), which may be ambient air. Second compressor outlet 114 is connected to duct 30 by a fluid line 116.

Third compressor 46 includes a third compressor wheel 120 carried on third shaft 56. A third compressor inlet 122 and a third compressor outlet 124 are associated with third compressor wheel 120. Third compressor inlet 122 is connected to a source of combustion air (not shown), which may be ambient air. Third compressor outlet 124 is connected to duct 30 by a fluid line 126.

Fourth compressor 48 includes a fourth compressor wheel 130 carried on fourth shaft 58. A fourth compressor inlet 132 and a fourth compressor outlet 134 are associated with fourth compressor wheel 130. Fourth compressor inlet 132 is connected to a source of combustion air (not shown), which may be ambient air. Fourth compressor outlet 134 is connected to duct 30 by a fluid line 136.

A control system 140 is provided for operating intake nozzles 66, 76, 86 and 96. Control system 140 senses operating conditions of engine 10 and/or turbocharger system 12. One or more engine sensors 142 and/or one or more turbocharger system sensors 144 are connected to a controller 146 via signal lines 148 and 150. While only a single engine sensor 142 and a single turbocharger system sensor 144 are schematically illustrated in FIG. 1 for simplicity, those skilled in the art will recognize and understand that numerous sensor types may be required. Several different sensor types, at a variety of locations in engine 10 and turbocharger system 12 may be required to provide appropriate signal inputs to controller 146. Such sensors are known to those skilled in the art, and will not be described in greater detail herein. Sensors 142 and 144 can be selected and positioned to generate a signal to controller 146 indicative of one or more conditions such as engine speed or load, intake manifold pressure, turbocharger speed, boost and barometric pressure. Intake nozzles 66, 76, 86 and 96 receive operating command signals for adjustment from controller 146 via signal lines 152, 154, 156 and 158.

INDUSTRIAL APPLICABILITY

During use of engine 10, a fuel, such as diesel fuel, is injected into combustion cylinders 14 and combusted when a piston (not shown) disposed within each combustion cylinder 14 is at or near a top dead center position. Exhaust gas is transported from each combustion cylinder 14 to exhaust manifold 18. Some of the exhaust gas within exhaust manifold 18 is transported to ducts 68, 78, 88 and 98 and inlet nozzles 66, 76, 86 and 96, for rotatably driving turbine wheels 60, 70, 80 and 90. The spent exhaust gas is discharged from turbines 32, 34, 36 and 38 to the ambient environment through turbine outlets 64, 74, 84 and 94.

Combustion air is drawn into compressors 42, 44, 46 and 48 through compressor inlets 102, 112, 122 and 132, and is compressed by compressor wheels 100, 110, 120 and 130. Compressed combustion air is passed through compressor outlets 104, 114, 124 and 134 and fluid lines 106. 116, 126 and 136 to duct 30, and then to intake manifold 16, to be supplied to cylinders 14 for combustion.

Engine sensors 142 and turbocharger system sensors 144 determine one or more operating conditions of engine 10 or turbocharger system 12, and send signals relating to the condition via signal lines 148 and 150 to controller 146. Controller 146 actuates adjustment of variable intake nozzles 66, 76, 86 and 96 to alter the performance of turbochargers 22, 24, 26 and 28, respectively. In actuating adjustment of nozzles 66, 76, 86 and 96, controller 146 sequentially transmits signals via signal lines 152, 154, 156 and 158 such that not all nozzles 66, 76, 86 and 96 are being adjusted simultaneously. In a preferred operation of turbocharger system 12, each turbocharger 22, 24, 26 and 28 is separately and individually adjusted. That is, only one turbocharger 22, 24, 26 or 28 is adjusted at one time, with adjustment of a next turbocharger 22, 24, 26 or 28 commencing only after adjustment of the previous one has stopped. Adjusting nozzles 66, 76, 86 and 96 one at a time, sequentially, reduces the magnitude of the change, allowing better control of and performance from turbocharger system 12.

It is preferred that a slight delay or pause exist between the completion of adjustment of one nozzle 66, 76, 86 or 96 and the start of adjustment of a next nozzle 66, 76, 86 or 96. However, the delay should be sufficiently short to prevent the onset of detrimental conditions, such as surge, excessive exhaust temperatures or excessive turbocharger speeds. If engine 10 is running in steady state, the delay can be time based, or can be based on an engine condition such as speed, load or an indicator of load. Turbocharger speed, boost and barometric pressure can be used to determine if and when a nozzle adjustment can and should occur without the onset of detrimental conditions such as surge, excessive exhaust temperatures or excessive turbocharger speeds. Engine sensors 142 and turbocharger system sensors 144 provide the necessary data signals of such conditions for controller 146.

By way of example, the operation of turbocharger system 12 may be in accordance with the following strategies:

A. When engine speed or load is increasing, and turbocharger speeds and/or boost are approaching limits, the nozzle area for the turbocharger with the highest shaft speed is increased first, followed by the turbocharger with the second highest shaft speed, and so forth, sequentially, until all nozzles have been adjusted, as appropriate for the new engine speed.

B. When engine speed or load is decreasing, and engine performance would be improved with increased boost, within turbocharger speed limits, the nozzle area for the turbocharger with the slowest shaft speed is decreased first, followed by the next slowest turbocharger, and so forth, sequentially, until all have been adjusted.

The present invention provides control of multiple parallel turbochargers having variable geometry inlets by sequentially adjusting the inlets in response to a need for adjustment. The invention is particularly advantageous when used with variable geometry turbines having discrete adjustment steps. During adjustment, the magnitude of change is reduced, providing smoother transition and performance.

Other aspects, objects and advantages of this invention can be obtained from a study of the drawings, the disclosure and the appended claims.

What is claimed is:

1. An internal combustion engine, comprising:
   a plurality of combustion cylinders;
   an exhaust manifold coupled with said combustion cylinders;
   an intake manifold coupled with said combustion cylinders;
   a plurality of turbochargers each including a turbine having a variable geometry inlet connected to said exhaust manifold and having an outlet, and including a compressor having an inlet and an outlet, said compressor outlet coupled with said intake manifold;
   a sensor for detecting at least one of an operating condition of said engine and an operating condition of said turbochargers and providing a signal dependent thereon; and
   a controller connected to said sensor for receiving said signal, and connected to said variable geometry inlets for sequential adjustment thereof in response to a need for adjustment, said controller adapted to cause adjustment of only one of said variable geometry inlets at a time, and to pause all said adjustments after completing one said adjustment before commencing another said adjustment.

2. The internal combustion engine of claim 1, each said variable geometry inlet having discrete steps for adjustment.

3. The internal combustion engine of claim 1, said sensor generating a signal on a signal line dependent on one of engine speed and load.

4. The internal combustion engine of claim 3, said sensor generating a signal on a signal line dependent on one of turbocharger speed, boost and barometric pressure.

5. The internal combustion engine of claim 1, said sensor generating a signal on a signal line dependent on one of turbocharger speed, boost and barometric pressure.

6. A turbocharger system for use with an internal combustion engine having a plurality of combustion cylinders, an intake manifold and an exhaust manifold, said turbocharger system comprising:

a plurality of turbochargers each including a turbine having a variable geometry inlet connected to said exhaust manifold and having an outlet, and including a compressor having an inlet and an outlet, said compressor outlet coupled with said intake manifold;

a sensor for detecting at least one of an operating condition of said engine and an operating condition of said turbochargers and providing a signal dependent thereon; and a controller connected to said sensor for receiving said signal, and connected to said variable geometry inlets for sequential adjustment thereof in response to a need for adjustment, said controller adapted to cause adjustment of only one of said variable geometry inlets at a time, and to pause all said adjustments after completing one said adjustment before commencing another said adjustment.

7. The turbocharger system of claim 6, each said variable geometry inlet having discrete steps for adjustment.

8. The turbocharger system of claim 6, said sensor generating a signal on a signal line dependent on one of engine speed and load.

9. The turbocharger system of claim 8, said sensor generating a signal on a signal line dependent on one of turbocharger speed, boost and barometric pressure.

10. The turbocharger system of claim 6, said sensor generating a signal on a signal line dependent on one of turbocharger speed, boost and barometric pressure.

11. A method of operating an internal combustion engine comprising steps of:

providing a plurality of combustion cylinders, an exhaust manifold and an intake manifold;

transporting exhaust gas from said combustion cylinders to said exhaust manifold;

providing a plurality of turbochargers, each turbocharger including a turbine having a variable geometry inlet and an outlet, and a compressor having an inlet and an outlet;

providing adjustment means for adjusting positions of said variable geometry inlets;

rotatably driving said turbines with exhaust gas introduced at said turbine inlets;

introducing combustion gas at said compressor inlets;

transporting combustion gas from said compressor outlets to said intake manifold;

sensing at least one of operating conditions of said engine and performance of said turbochargers;

controlling said adjustment means in response to at least one of said engine operating conditions and said performance of said turbochargers; and adjusting at least some of said variable inlets sequentially, including pausing said adjusting step after completing adjustment of one variable geometry turbine before commencing said adjusting of another variable geometry turbine.

12. The method of claim 11, said adjusting step performed sequentially for each of said variable geometry inlets.

13. The method of claim 11, said sensing step including sensing at least one of turbocharger speed, turbocharger boost, engine speed and engine load.

14. The method of claim 11, said sensing step including sensing at least one of turbocharger speed, turbocharger boost, engine speed and engine load.

15. The method of claim 11, including terminating said pausing and commencing a subsequent adjusting step for another variable geometry inlet in response to at least one of operating conditions of the engine and operating performance of the turbochargers.

16. A method for operating multiple parallel turbochargers for an internal combustion engine, comprising steps of;

providing a variable geometry turbine for each turbocharger;

sensing at least one of operating conditions of the engine and operating performance of the turbochargers;

determining a need to adjust the variable geometry turbines; and adjusting the variable geometry turbines sequentially, completing adjusting one of said turbines before commencing adjusting another of said turbines, including pausing said adjusting step after completing adjustment of one variable geometry turbine before commencing said adjusting of another variable geometry turbine.

17. The method of claim 16, including terminating said pausing and commencing a subsequent adjusting step for another variable geometry turbine in response to at least one of operating conditions of the engine and operating performance of the turbochargers.

18. A method for operating multiple parallel turbochargers for an internal combustion engine, comprising steps of;

providing a variable geometry turbine for each turbocharger;

sensing at least one of operating conditions of the engine and operating performance of the turbochargers;

determining a need to adjust the variable geometry turbines; and adjusting the variable geometry turbines sequentially, completing adjusting one of said turbines before commencing adjusting another of said turbines, including determining one of increasing engine speed and increasing load, determining the relative speeds of all turbines, and adjusting the turbines sequentially from the fastest turbine to the slowest turbine.

19. The method of claim 18, including providing an adjustable nozzle on each turbine, and increasing the nozzle area of each turbine sequentially from the fastest turbine to the slowest turbine.

20. A method for operating multiple parallel turbochargers for an internal combustion engine, comprising steps of;

providing a variable geometry turbine for each turbocharger;

sensing at least one of operating conditions of the engine and operating performance of the turbochargers;

determining a need to adjust the variable geometry turbines; and adjusting the variable geometry turbines sequentially, completing adjusting one of said turbines before commencing adjusting another of said turbines, including determining one of decreasing engine speed and decreasing load, determining the relative speeds of all turbines, and adjusting the turbines sequentially from the slowest turbine to the fastest turbine.

21. The method of claim 20, including providing an adjustable nozzle on each turbine, and decreasing the nozzle area of each turbine sequentially from the slowest turbine to the fastest turbine.

* * * * *